Inventor
FRANK L. HELTON

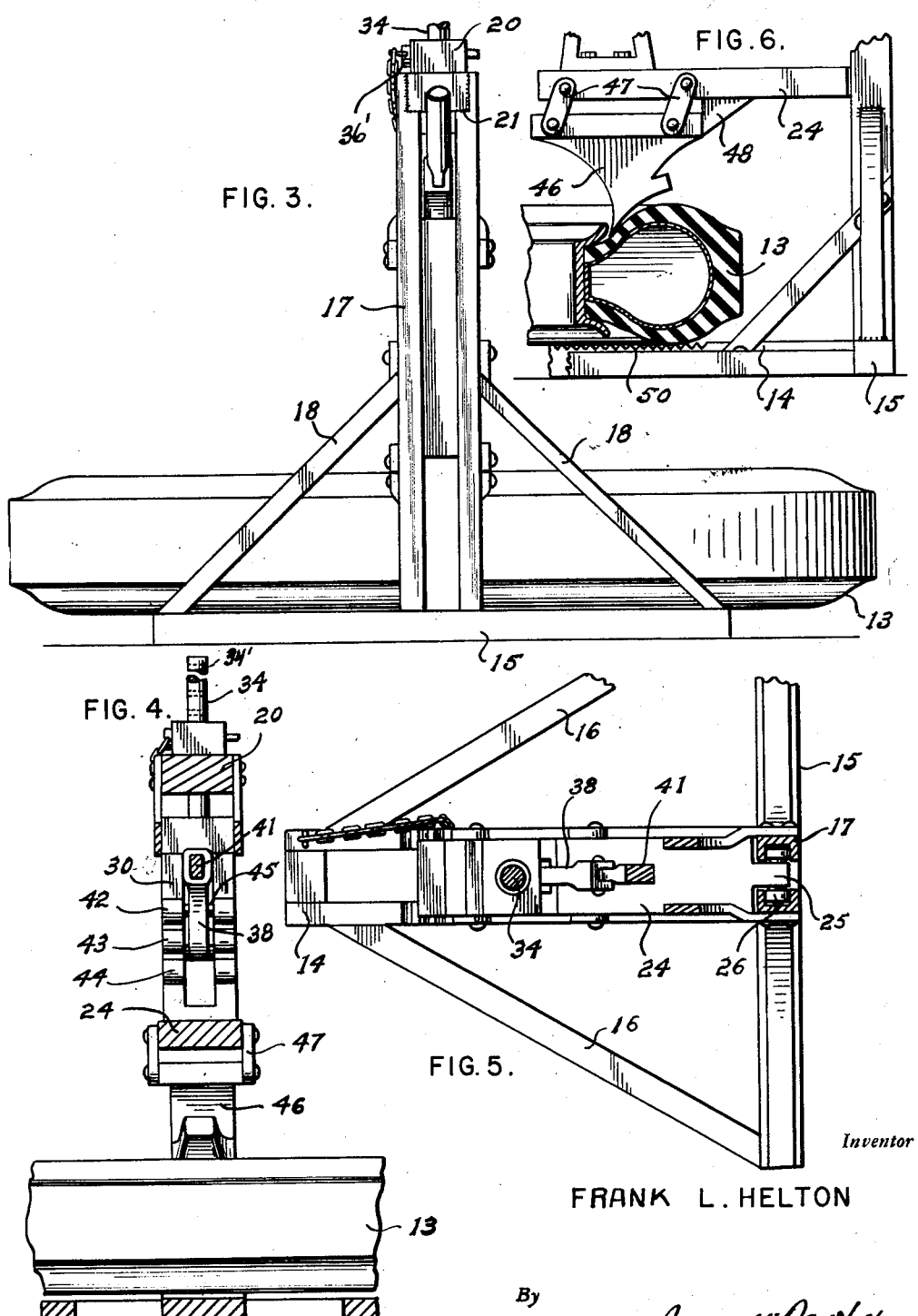

Patented June 3, 1952

2,598,793

UNITED STATES PATENT OFFICE 2,598,793

LEVER ACTUATED AXIALLY SHIFTING TYPE TIRE LOOSENING APPARATUS

Frank London Helton, San Benito, Tex.

Application September 24, 1949, Serial No. 117,641

3 Claims. (Cl. 157—1.17)

The present invention relates to tire changing apparatus and more particularly, has reference to a power actuated unit which will develop sufficient force to readily remove the tire but which will not damage the sidewall during the removing or dislodging operation from the rim, and the apparatus finds especial application for removing tires from vehicle wheels such as are used on trucks, trailors, tractors and other heavy equipment.

Broadly, the invention comprises a suitable reinforced framework, a casing engaging shoe slidably mounted on the framework for movement toward and away from the vehicle wheel and power means to impart movement to the shoe toward the wheel whereby the shoe is moved under the rim to break the casing loose from the rim. A lock-unit is associated with the so-called shoe structure to maintain the structure away from the wheel while the latter is being turned to the next location where it is desired to release the casing.

An object of the present invention is to provide a tire changing apparatus wherein the apparatus is readily adjustable for use with tires of different widths and diameters and which will easily and quickly release the casing from the rim when the casing engaging shoe is rendered active.

Another object of the invention is to provide an appliance of the character described wherein a mechanical linkage is operatively connected with the casing engaging shoe and a suitable handle member whereby movement of the handle causes the linkage to force the shoe against the casing and under the rim to break or release the casing from the rim.

Yet a further object of my invention is to provide a tire changing apparatus wherein the tire casing releasing operation may be accomplished without the employment of any special wheel supporting or mounting units.

Still another object of the invention is to provide a tire removing apparatus which includes few essential working parts, positive and efficient in operation and which can be easily and economically manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of the application, wherein like numerals denote corresponding parts in the several views, and in which—

Figure 3 is an end view of the apparatus illustrated in Figure 2.

Figure 4 is a sectional view taken along the line 4—4 of Figure 1, looking in the direction of the arrows.

Figure 5 is a view in section taken along the line 5—5 of Figure 1, looking in the direction of the arrows, and Figure 6 is a fragmental detail view of the casing engaging shoe.

Figure 1:
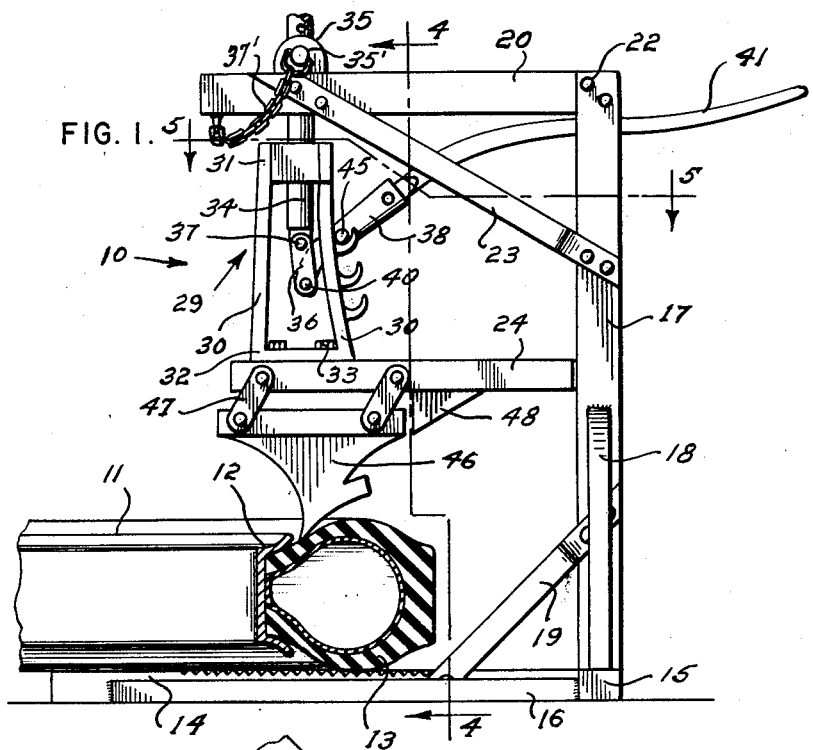
Figure 1 is a view in side elevation showing the apparatus prior to the casing releasing step.
Figure 2:
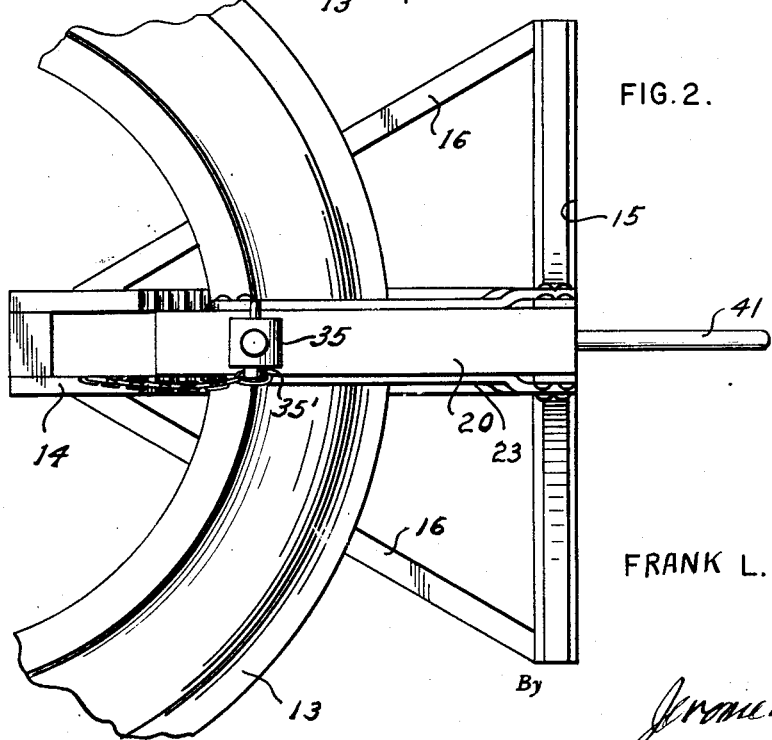
Figure 2 is a top plan view of the apparatus shown in Figure 1.

As shown in Figure 1, the numeral 10 denotes the supporting framework and 11 indicates a vehicle wheel having a rim 12 and tire 13. The framework includes a horizontal base or surface engaging member 14, the inner end of which is suitably secured to a complemental base member 15, the members 14 and 15 being disposed at right angles to each other. To provide a stable supporting structure, a diagonal brace 16 extends from each end of the base 15 to a location adjacent the free end of the base 14. The bases 14, 15 and the braces 16 are preferably channel irons, although other structural members may be employed.

A pair of spaced apart vertically disposed channel bars 17 are welded at their lower ends to the base 15 intermediate the ends of the base and are braced by diagonal straps 18 secured to the base 15. Additional braces 19 may extend from the channel bars to the braces 16 whereby the channels will be firmly held in the vertical position.

A horizontal bar 20 fits in a recess or seat 21 in the upper ends of the channels 18 and is affixed therein by nut and bolt assemblies 22. A brace strap 23 is fastened to each side face of the bar and each channel 18 in any convenient manner. Hence, the bar 20 will be maintained in parallel relation to the base 14.

A rectangular platform 24 is reduced at its inner end to form an extension 25 and, as shown in Figure 5, the extension is disposed between the channels 18. The extension carries rollers 26 which ride between the flanges of the channel bars so that the platform 24 may have free vertical movement relative to the channels as will later be more fully described.

A casing or housing 29 having end walls 30, top and bottom walls 31 and 32 is secured to the outer end of the platform by nut and bolt assemblies 33 associated with the bottom wall 32 and the platform. A rod-like element 34 extends through a slot formed in a block 35 on the horizontal bar 20 and also through an opening in the bar 20 and downwardly through a slot in the top wall 31 of the casing 29. As shown in Figure 4, the rod-like element is provided with a plurality of vertically spaced horizontally disposed apertures 34', and a horizontal opening 35' is formed in the block 35. A pin or eye bolt 36' is attached to a chain 37', which chain, in turn, is conveniently secured to the bar 20 adjacent the outer end thereof to support the eye bolt in a convenient location to the user of the apparatus. By placing the bolt 36' through the opening 35' and through the aperture 34' registering therewith, the rod-like element 34 will be held in the desired position.

A link 36 is pivoted in a bifurcation at the lower end of the rod-like element as at 37. The free or opposite end of the link is hinged to a socket 38 which projects through an elongated slot in the wall 30, the connection being shown at 40. The socket is adapted to receive a handle 41 which is of such length as to extend a substantial distance beyond the framework to enable easy operation of the handle.

With reference to Figures 1 and 4, it will be noted that the wall 30 is provided with a plurality of superposed pairs of spaced hooks 42, 43 and 44 on opposite sides of the slot. Each pair of alined hooks serves to receive a pivot pin 45 on the socket 38 whereby the socket and handle is pivotally connected to the casing and the pair of hooks employed depends upon the size of the tire being worked on.

A casing engaging shoe or wedge 46 is suspended from the platform 24 by means of shackles 47, the shackles being pivoted at their upper ends to the platform, while the lower ends are hinged to the shoe. A scotch or lug 48 is carried by the bottom face of the platform to hold the wedge in positioned to move upwardly against the housing 29.

As illustrated in Figure 6, the base 14 may be provided with a series of transversely extending shallow notches 50, the notches serving to prevent the wheel from slipping during the operating cycle.

The employment of the apparatus may briefly be summarized as follows:

The platform is raised to a position sufficiently high to clear the wheel to be worked upon, and the eye bolt 36' is then inserted through the opening and aperture in the rod-like element 34 to hold the assembly in this position. The wheel is then moved on the base so that the rim will be below the operating end of the shoe 46. With the wheel in this position, the eye bolt is then withdrawn, enabling the platform 24 and the associated parts to move downwardly until the operating nose of the wedge 46 is in the proper position. The eye bolt is then inserted through the opening in the block 35 and through the horizontal aperture 34 closest to the adjustment, and by depressing the handle 41, the link 36 will move upwardly against the rod-like element 34, whereby the casing 29 will be forced downwardly together with the platform, and as the shoe 46 meets the resistance offered by the tire, it will be moved outwardly until it engages the lower face of the platform 24. Hence, the wedge or shoe 46 will exert great pressure between the casing and the rim, thus easily freeing the tire from the rim. Of course the foregoing cycle is then repeated.

I claim:

1. In an apparatus for changing tires, a horizontal support on which the tire is adapted to rest, a standard secured to and extending upwardly from the support, a horizontal platform mounted for vertical movement on the standard, a shoe pivotally secured to and depending from the platform, a horizontal abutment attached to the standard at a point above the platform, a casing fixed to the platform, a rod-like element secured to the abutment and extending into the casing, a link pivoted to the rod-like element, a handle projecting into the casing, a pivotal connection between the handle and the link and means to pivotally connect the handle to the casing whereby movement of the handle moves the link upwardly against the rod-like element and the casing and platform downwardly thus forcing the shoe between the tire and rim to release the tire.

2. An apparatus as claimed in claim 1, wherein the handle is provided with a pivot pin adapted to engage spaced hooks on the casing for effecting the connection between the handle and casing.

3. An apparatus for changing tires as defined in and claimed by claim 1, further characterized in that the means pivotally securing the shoe to the platform includes spaced sets of shackles pivoted at one end to the platform and at the opposite end to the shoe, and a stop element adapted to engage the shoe.

FRANK LONDON HELTON.

REFERENCES CITED

The following references are of record in the file of this patent:

UNITED STATES PATENTS

| Number | Name | Date |
|---|---|---|
| 1,415,865 | Brown | May 16, 1922 |
| 1,742,590 | Freivogel | Jan. 7, 1930 |
| 1,983,608 | Hand | Dec. 11, 1934 |
| 2,436,003 | Gosselin | Feb. 17, 1948 |
| 2,513,707 | Barnett | July 4, 1950 |
| 2,547,976 | Rockwell | Apr. 10, 1951 |

OTHER REFERENCES

Aviation Magazine, page 157, April 1945.